United States Patent
Kishida et al.

(10) Patent No.: US 10,181,602 B2
(45) Date of Patent: Jan. 15, 2019

(54) REDOX CATALYST, ELECTRODE MATERIAL, ELECTRODE, MEMBRANE ELECTRODE ASSEMBLY FOR FUEL CELLS, AND FUEL CELL

(71) Applicants: ZEON CORPORATION, Chiyoda-ku, Tokyo (JP); KYUSHU UNIVERSITY, Fukuoka-shi, Fukuoka (JP)

(72) Inventors: Masahiro Kishida, Fukuoka (JP); Sakae Takenaka, Fukuoka (JP); Akihiko Yoshiwara, Tokyo (JP); Kiyoshige Kojima, Tokyo (JP)

(73) Assignees: ZEON CORPORATION, Chiyoda-ku, Tokyo (JP); KYUSHU UNIVERSITY, Fukuoka-shi, Fukuoka (JP)

( * ) Notice: Subject to any disclaimer, the term of this patent is extended or adjusted under 35 U.S.C. 154(b) by 12 days.

(21) Appl. No.: 15/312,331

(22) PCT Filed: May 27, 2015

(86) PCT No.: PCT/JP2015/002690
§ 371 (c)(1),
(2) Date: Nov. 18, 2016

(87) PCT Pub. No.: WO2015/182138
PCT Pub. Date: Dec. 3, 2015

(65) Prior Publication Data
US 2017/0117555 A1  Apr. 27, 2017

(30) Foreign Application Priority Data
May 30, 2014 (JP) ................................. 2014-113168

(51) Int. Cl.
*H01M 4/133* (2010.01)
*H01M 4/86* (2006.01)
(Continued)

(52) U.S. Cl.
CPC .......... *H01M 4/8663* (2013.01); *B01J 23/42* (2013.01); *B01J 33/00* (2013.01); *B01J 35/02* (2013.01);
(Continued)

(58) Field of Classification Search
CPC ............... H01M 4/8663; H01M 4/926; H01M 2008/1095
See application file for complete search history.

(56) References Cited

U.S. PATENT DOCUMENTS

2009/0291352 A1  11/2009  Oshihara et al.
2014/0353556 A1  12/2014  Shigeta et al.

FOREIGN PATENT DOCUMENTS

EP  1787955 A1  5/2007
EP  2031683 A1  3/2009
(Continued)

OTHER PUBLICATIONS

Aug. 4, 2015, International Search Report issued in the International Patent Application No. PCT/JP2015/002690.
(Continued)

*Primary Examiner* — Cynthia K Walls
(74) *Attorney, Agent, or Firm* — Kenja IP Law PC (57) ABSTRACT

Provided is a redox catalyst wherein a catalytically active component is supported on carbon nanotubes whose average diameter (Av) and standard deviation ($\sigma$) of diameters satisfy the condition $0.60 > 3\sigma/\text{Av} > 0.20$, and at least a part of a surface of the carbon nanotubes, including a part on which the catalytically active component is supported, is covered with porous inorganic material.

7 Claims, 1 Drawing Sheet

(51) Int. Cl.
  *B01J 23/42* (2006.01)
  *B01J 33/00* (2006.01)
  *B01J 35/02* (2006.01)
  *H01M 4/90* (2006.01)
  *H01M 8/02* (2016.01)
  *H01M 4/92* (2006.01)
  *H01M 8/1004* (2016.01)
  *H01M 4/88* (2006.01)
  *H01M 8/10* (2016.01)
  *H01M 8/1018* (2016.01)

(52) U.S. Cl.
  CPC ........... *H01M 4/86* (2013.01); *H01M 4/8652* (2013.01); *H01M 4/8657* (2013.01); *H01M 4/8803* (2013.01); *H01M 4/8842* (2013.01); *H01M 4/90* (2013.01); *H01M 4/9041* (2013.01); *H01M 4/9083* (2013.01); *H01M 4/926* (2013.01); *H01M 8/02* (2013.01); *H01M 8/1004* (2013.01); *H01M 8/10* (2013.01); *H01M 2008/1095* (2013.01)

(56) References Cited

FOREIGN PATENT DOCUMENTS

| | | |
|---|---|---|
| EP | 2497573 A1 | 9/2012 |
| EP | 3101663 A1 | 12/2016 |
| JP | 2008004541 A | 1/2008 |
| JP | 2011238371 A | 11/2011 |
| TW | 201304266 A | 1/2013 |
| WO | 2006011655 A1 | 2/2006 |
| WO | 2013080912 A1 | 6/2013 |

OTHER PUBLICATIONS

Sep. 20, 2017, Extended European Search Report issued by the European Patent Office in the corresponding European Patent Application No. 15800056.2.

Dec. 6, 2016, International Preliminary Report on Patentability issued in the International Patent Application No. PCT/JP2015/002690.

REDOX CATALYST, ELECTRODE MATERIAL, ELECTRODE, MEMBRANE ELECTRODE ASSEMBLY FOR FUEL CELLS, AND FUEL CELL

TECHNICAL FIELD

This disclosure relates to a redox catalyst, an electrode material including the redox catalyst, an electrode formed using the electrode material, a membrane electrode assembly for fuel cells including the electrode, and a fuel cell including the membrane electrode assembly for fuel cells.

BACKGROUND ART

Recently, redox catalysts in which metal is supported on the surface of a carbonaceous catalyst carrier have been proposed for use for example in electrodes for fuel cells. It has also been proposed to use carbon nanotubes as a catalyst carrier for such redox catalysts. Metal-supporting carbon nanotubes are generally prepared by attaching a metal precursor onto the surface of carbon nanotubes, reducing the metal precursor into metal, and fixing the metal by sintering. This preparation method, however, has a problem of unwanted aggregation of carbon nanotubes during sintering.

On the other hand, exposure of metal on the surface of carbon nanotubes results in a problem of elution of the metal by contact with electrolyte for example when the metal-supporting carbon nanotubes are used in an electrode of a fuel cell as a redox catalyst. Known techniques for solving this problem involve covering metal-supporting carbon nanotubes with a protection film made of inorganic material such as silica. Nevertheless, these techniques suffer from a problem of inability to well cover metal-supporting carbon nanotubes with a protection film made of inorganic material when the carbon nanotubes are aggregated as described above.

To solve this problem, PTL 1 discloses a technique which involves attaching a metal precursor to the surface of carbon nanotubes, reducing the metal precursor to its reduced state, and further covering the metal-supporting carbon nanotubes with a protection film made of inorganic material, followed by fixation of the metal by sintering. In this case, since metal fixation by sintering is not performed prior to coverage by the protection film, aggregation of the carbon nanotubes does not take place, allowing the metal-supporting carbon nanotubes to be sufficiently covered by the protection film.

CITATION LIST

Patent Literature

PTL 1: JP2008-004541A

SUMMARY

Technical Problem

However, according to the studies conducted by the inventors, it has been found that even metal-supporting carbon nanotubes covered with a protection film made of inorganic material such as those disclosed in PTL 1 still have room for improvement in durability and catalytic activity.

It would therefore be helpful to provide a redox catalyst useful as an electrode catalyst, which has high durability and superior catalytic activity, an electrode material including the redox catalyst, an electrode formed using the electrode material, a membrane electrode assembly for fuel cells including the electrode, and a fuel cell including the membrane electrode assembly for fuel cells.

Solution to Problem

As a result of extensive studies conducted by the inventors in an aim to solve the foregoing problem, it has been established that a redox catalyst wherein a catalytically active component is supported on carbon nanotubes whose average diameter (Av) and standard deviation (σ) of diameters satisfy a specific condition and wherein at least a part of the surface of the carbon nanotubes, including a part on which the catalytically active component is supported, is covered with porous inorganic material has high durability and superior catalytic activity. The inventors thus completed this disclosure.

Specifically, the redox catalyst disclosed herein is characterized in that a catalytically active component is supported on carbon nanotubes whose average diameter (Av) and standard deviation (σ) of diameters satisfy the condition $0.60 > 3\sigma/Av > 0.20$ and that at least a part of the surface of the carbon nanotubes, including a part on which the catalytically active component is supported, is covered with porous inorganic material. The redox catalyst has high durability and superior catalytic activity, making it useful as an electrode catalyst.

In the redox catalyst, the carbon nanotues preferably have a carbon monoxide desorption of 1,000 to 20,000 and a carbon dioxide desorption of 500 to 10,000 μmol/g, as measured at from 150° C. to 950° C. in temperature programmed desorption. In this case, the catalytically active component is firmly supported on the carbon nanotubes enabling the catalytically active component (or its precursor) to be prevented from coming off the carbon nanotubes during preparation of a dispersion liquid containing the carbon nanotubes and catalytically active component (or its precursor). Further, in this case, the carbon nanotubes are highly dispersed in the dispersion allowing the catalytically active component to be uniformly supported on the carbon nanotubes to achieve further improvement in the catalytic activity of the redox catalyst.

In a preferred example of the redox catalyst, the catalytically active component is metal nanoparticles. In this case the catalytically active component has a large surface area and therefore the redox catalyst exhibits high catalytic activity.

The electrode material disclosed herein is characterized by including the above-described redox catalyst. The electrode material includes the above-described redox catalyst and is therefore useful for the manufacture of an electrode which has high durability as well as superior catalytic activity in the electrode reaction.

The electrode disclosed herein is characterized by being formed using the above-described electrode material. The electrode is formed using the above-described electrode material and therefore has high durability as well as superior activity as an electrode.

The membrane electrode assembly for fuel cells disclosed herein is characterized by including the above-described electrode and an electrolyte film. The membrane electrode assembly for fuel cells includes the above-described electrode and therefore has high durability as well as superior activity in the electrode. Further, in the membrane electrode assembly for fuel cells, it is possible to prevent elution of the catalytically active component at an interface between the catalyst layer of the electrode and the electrolyte film.

The fuel cell disclosed herein is characterized by including the above-described membrane electrode assembly. The fuel cell includes the above-described membrane electrode assembly and therefore has high durability as well as superior power generation efficiency.

Advantageous Effect

According to this disclosure, it is possible to provide a redox catalyst useful as an electrode catalyst, which has high durability and superior catalytic activity. According to this disclosure, it is also possible to provide an electrode material including the redox catalyst, an electrode formed using the electrode material, a membrane electrode assembly for fuel cells including the electrode, and a fuel cell including the membrane electrode assembly for fuel cells.

BRIEF DESCRIPTION OF THE DRAWINGS

In the accompanying drawings.

DETAILED DESCRIPTION

[Redox Catalyst]
The following provides a detailed description of a redox catalyst disclosed herein.

The redox catalyst includes carbon nanotubes described later, a catalytically active component supported on the carbon nanotubes, and porous inorganic material which covers at least a part of the surface of the carbon nanotubes, including a part on which the catalytically active component is supported. The redox catalyst has high durability and superior catalytic activity and is useful as an electrode catalyst.

<Carbon Nanotubes>

Carbon nanotubes (hereinafter occasionally abbreviated as "CNTs") used for the redox catalyst have an average diameter (Av) and a standard deviation ($\sigma$) of diameters which satisfy the condition $0.60 > 3\sigma/Av > 0.20$, and preferably $0.60 > 3\sigma/Av > 0.50$. When the value of $3\sigma/Av$ falls within any of the ranges, it is possible to obtain a redox catalyst which has high durability and superior catalytic activity.

"Diameter" as used in the average diameter refers to an outer diameter of a CNT. "$3\sigma$" refers to a sample standard deviation ($\sigma$) of diameters of CNTs multiplied by 3 and indicates a distribution of diameters (hereinafter occasionally abbreviated as "diameter distribution ($3\sigma$)").

"Average diameter (Av) of CNTs" and "sample standard deviation ($\sigma$) of diameters of CNTs" refer to values obtained by measuring the diameters (outer diameters) of 100 randomly-selected CNTs under observation by transmission electron microscopy. Further, CNTs whose diameter distribution follows a normal distribution when the diameters measured as described above are plotted on a graph's horizontal axis and their frequency on the vertical axis and approximated by Gaussian distribution are commonly used.

The average diameter (Av) of the CNTs is preferably 0.5 nm to 15 nm, and more preferably 1 nm to 10 nm. When the average diameter (Av) of the CNTs falls within any of these ranges, the redox catalyst shows improved durability and catalytic activity.

The average length of the CNTs is preferably 0.1 μm to 1 cm, and more preferably 0.1 μm to 1 mm. When the average length of the CNTs falls within any of the above ranges, it becomes easy to form a redox catalyst having high durability and superior catalytic activity. The average length of the CNTs is obtained by measuring the lengths of 100 randomly-selected CNTs under observation by transmission electron microscopy.

The CNTs preferably have a carbon monoxide (CO) desorption of 1,000 μmol/g to 20,000 μmol/g and a carbon dioxide ($CO_2$) desorption of 500 μmol/g to 10,000 μmol/g, as measured at from 150° C. to 950° C. in temperature programmed desorption. In this case, the catalytically active component is firmly supported on the carbon nanotubes enabling the catalytically active component (or its precursor) to be prevented from coming off the carbon nanotubes during preparation of a dispersion liquid containing the carbon nanotubes and catalytically active component (or its precursor). Further, in this case, the carbon nanotubes are highly dispersed in the dispersion liquid allowing the catalytically active component to be uniformly supported on the carbon nanotubes to achieve further improvement in the catalytic activity of the redox catalyst.

CO and $CO_2$ present in gas produced during temperature programmed desorption originate from various functional groups bonded to the surface of the CNTs such as hydroxyl group, carboxyl group, ketone group, lactone group, aldehyde group, and methyl group. When the CNTs have the amounts of CO and $CO_2$ desorption described above, it is presumed that particularly hydroxyl groups and carboxyl groups are present in higher amounts on their surface. Such CNTs are highly dispersed in a CNT dispersion liquid, and further, the catalytically active component does not easily come off from the CNTs. The amount of CO desorption is preferably 1,200 μmol/g to 15,000 μmol/g, more preferably 1,500 μmol/g to 10,000 μmol/g, and still more preferably 2,000 μmol/g to 7,000 μmol/g. The amount of $CO_2$ desorption is preferably 600 μmol/g to 10,000 μmol/g, more preferably 800 μmol/g to 8,000 μmol/g, and still more preferably 1,000 μmol/g to 6,000 μmol/g.

The amounts of CO and $CO_2$ desorption of the CNTs in temperature programmed desorption can be obtained by any of the methods known in the art. Specifically, adsorbed water is first desorbed from the surface of CNTs by heat treatment of the CNTs in a given temperature programmed desorption device. Next, the heat-treated CNTs are heated to a given temperature in inert gas such as helium gas, and the amounts of CO and $CO_2$ that are produced along with desorption of functional groups (e.g., oxygen-containing compounds) from the surface of the CNTs are quantified. Next, the heat treated CNTs are heated to a specific temperature in an inert gas such as helium gas, and the amounts of CO and $CO_2$ that are produced due to desorption of functional groups (e.g., oxygen atom-containing compounds) from the surface of the CNTs are quantified.

The amount of CO desorption or $CO_2$ desorption at from 150° C. to 950° C. in temperature programmed desorption is obtained by initially heating the CNTs to 150° C. and then measuring the total amount of CO or the total amount of $CO_2$ that is desorbed when the CNTs are further heated to 950 C.°.

The CNTs preferably have a BET specific surface area of 600 $m^2/g$ to 2,800 $m^2/g$, more preferably 800 $m^2/g$ to 2,500 $m^2/g$, still more preferably 1,000 $m^2/g$ to 2,300 $m^2/g$, and most preferably 1,200 $m^2/g$ to 2,000 $m^2/g$, as measured by nitrogen adsorption. When the specific surface area of the CNTs falls within any of these ranges, the CNTs exhibit good dispersibility in various solvents.

The BET specific surface area can be obtained through the BET method by measuring a nitrogen adsorption isotherm at 77 K. Measurement of the BET specific surface area can for example be performed using "BELSORP (registered trademark in Japan, other countries, or both)-max" (Bel Japan Inc.).

The CNTs preferably have a plurality of micropores. In particular, the CNTs preferably have micropores having a pore diameter of smaller than 2 nm. In terms of the amount of micropores present, the micropore volume as obtained through the method described below is preferably 0.4 mL/g or more, more preferably 0.43 mL/g or more, and still more preferably 0.45 mL/g or more, and normally has an upper limit on the order of 0.65 mL/g. It is preferable that the CNTs have micropores such as those described above from the viewpoint of improving dispersibility of the CNTs. Micropore volume can for example be adjusted through appropriate alteration of a preparation method and preparation conditions of the CNTs.

"Micropore volume (Vp)" can be calculated using Equation (I): $Vp=(V/22,414) \times (M/p)$ by measuring a nitrogen adsorption isotherm of the CNTs at liquid nitrogen temperature (77 K) with the amount of adsorbed nitrogen at a relative pressure $P/P_0$ of 0.19 being defined as V, where P is a measured pressure at adsorption equilibrium, and $P_0$ is a saturated vapor pressure of liquid nitrogen at time of measurement. In Equation (I), M is a molecular weight of 28.010 of the adsorbate (nitrogen), and p is a density of 0.808 g/cm$^3$ of the adsorbate (nitrogen) at 77 K. Micropore volume can for example be obtained using "BELSORP (registered trademark in Japan, other countries, or both)-mini" (Bel Japan Inc.).

Any method can be used for the manufacture of the CNTs as long as CNTs whose average diameter (Av) and standard deviation (σ) of diameters satisfy the above-described condition are produced; however, the super growth method is particularly preferable. The super growth method refers to a method in which during synthesis of carbon nanotubes through chemical vapor deposition (CVD) by supplying a feedstock compound and a carrier gas onto a substrate (also referred to below as a "substrate for CNT manufacture") having a catalyst layer for carbon nanotube manufacture on the surface thereof, the catalytic activity of the catalyst layer for CNT manufacture is dramatically improved by providing a trace amount of an oxidizing agent in the system (see WO2006/011655). More specifically, in this method, the catalyst layer was formed on the surface of the substrate through a wet process and a gas having acetylene as the main component (e.g., gas containing at least 50% by volume of acetylene) is used as a feedstock gas, so that CNTs having the above-described properties can be effectively manufactured.

For the adjustment of the amounts of CO desorption and $CO_2$ desorption and/or the BET specific surface area by nitrogen adsorption, it is generally preferable that the CNTs be subjected to known oxidization treatment, e.g., ozone treatment or treatment using a liquid oxidizing agent such as nitric acid.

Ozone treatment can be performed by placing feedstock CNTs in a container and then using an ozone generating device to introduce an ozone-containing gas into the container normally at normal pressure, and causing a reaction to take place for 1 minute to 720 minutes, and preferably 30 minutes to 600 minutes, while adjusting the temperature of the feedstock CNTs to 0° C. to 100° C., and preferably 20° C. and 50° C.

The ozone-containing gas is diluted with air or nitrogen and has an ozone concentration of preferably 0.01 g/Nm$^3$ to 100 g/Nm$^3$, more preferably 1 g/Nm$^3$ to 70 g/Nm$^3$, and still more preferably 10 g/Nm$^3$ to 50 g/Nm$^3$. The ozone-containing gas can have any level of humidity, but humidity is in the normal range from 20% RH to 90% RH.

In this way the feedstock CNTs are treated with ozone on their surface. Ozone treatment can be performed using gas. Consequently, the resultant CNTs after completion of reaction can be used as a dry solid straight away.

Any nitric acid can be used in nitric acid treatment as long as it contains nitric acid, and it encompasses fuming nitric acid and a mixture acid mixed with sulfuric acid. The nitric acid that is used normally has a purity of 5% or more, preferably 50% or more, and more preferably 80% or more. Normally 200 parts by mass to 10,000 parts by mass of nitric acid are added per 100 parts by mass of feedstock CNTs. At the time of addition, the resultant mixture may be subjected to ultrasonic treatment to disperse the feedstock CNTs. Thereafter, the resultant mixture may be heated. Any heating method can be used as long as it is a commonly used method which may be selected as appropriate from among methods such as heating in an oil bath or a heating mantle, and heating by microwave irradiation. Heating may be performed at normal or increased pressure in an autoclave or the like. At normal pressure, heating is normally performed for 0.1 hours to 50 hours at 30° C. to 120° C., whereas at increased pressure, heating is normally performed for 0.1 hours to 50 hours at 30° C. to 200° C. On the other hand, heating by microwave irradiation is normally performed by setting microwave output such that the above-described mixture is heated for 0.01 hours to 24 hours at 30° C. to 120° C. for heating at normal pressure, and at 30° C. to 200° C. for heating at increased pressure. In any of the cases described above, heating may be performed in one stage or may be performed in two or more stages. The mixture is preferably stirred during heating by any appropriate stirring means.

In this way feedstock CNTs are treated with nitric acid on their surface. The resultant mixture is cooled to room temperature because it is extremely hot upon completion of the treatment. Next, nitric acid is for example removed by decantation and the treated CNTs are washed for example with water. Washing is normally performed until washing waste water is neutral.

It is assumed that as a result of the CNTs being surface-treated with nitric acid, in addition to the above-described functional groups, nitro groups (—$NO_2$) will become bonded to the surface of the CNTs. The presence of such nitro groups is thought to make a significant contribution toward improving electrical conductivity and dispersibility of the CNTs.

The CNTs can be of any structure; examples include single-walled carbon nanotubes (SWCNTs) and multi-walled carbon nanotubes (MWCNTs). From the perspective of increasing electrical conductivity and mechanical properties, single- to 5-walled carbon nanotubes are preferable, with single-walled carbon nanotubes being more preferable.

<Catalytically Active Component>

The catalytically active component for use in the redox catalyst disclosed herein is supported on the above-described carbon nanotubes, and at least a part of the surface of the carbon nanotubes, including a part on which the catalytically active component is supported, is covered with porous inorganic material described later.

The catalytically active component is preferably metal nanoparticles. The metal nanoparticles are particles of the order of nanometers in diameter, with the average particle diameter being preferably 0.5 nm to 15 nm and the standard deviation of diameters being preferably 1.5 nm or less. The average diameter and standard deviation of diameters of metal nanoparticles are obtained by measuring the diameters of 100 randomly-selected metal nanoparticles in a transmission electron microscopic image. When the catalytically active component is metal nanoparticles, it has a large specific area and therefore the redox catalyst has high catalytic activity.

Although the metal nanoparticles are appropriately selected depending on the intended catalytic activity, it is preferable to use nanoparticles of the metals of Groups 4 to 14 in the periodic table. Examples of the metals of Groups 4 to 14 in the periodic table include titanium, vanadium, chrome, manganese, iron, cobalt, nickel, copper, zinc, gallium, germanium, zirconium, niobium, molybdenum, technetium, ruthenium, rhodium, palladium, silver, cadmium, indium, tin, hafnium, tantalum, tungsten, rhenium, osmium, iridium, platinum, gold, and mercury. Of these metals, from the perspective of their ability to provide a redox catalyst that has high versatility, iron, cobalt, nickel, copper, ruthenium, rhodium, palladium, silver, osmium, iridium, platinum, and gold are preferable, with platinum being most preferable. These metals may be used alone or in combination.

Any amount of the catalytically active component can be supported on the carbon nanotubes in the redox catalyst; however, it is normally 0.1% by mass to 99% by mass, preferably 5% by mass to 90% by mass, more preferably 10% by mass to 80% by mass, and still more preferably 10% by mass to 30% by mass, when expressed as mass percentage of the total of carbon nanotubes and catalytically active component [catalytically active component/(carbon nanotubes+catalytically active component)]. When the amount of the supported catalytically active component is 0.1% by mass or more in terms of the above-described percentage, it is possible to obtain a redox catalyst with better catalytic activity. On the other hand, while it is believed that catalytic activity increases with increasing amount of the supported catalytically active component, in light of the supporting ability of carbon nanotubes and economic efficiency, the upper limit of the amount of the supported catalytically active component is no greater than 99% by mass in terms of the above-described percentage.

<Porous Inorganic Material>

The porous inorganic material used in the redox catalyst disclosed herein covers at least a part of the surface of carbon nanotubes, including a part on which the catalytically active component described above is supported, thus preventing elution of the catalytically active component from the redox catalyst.

Materials for the porous inorganic material are preferably those which are inactive to intended electrode reactions, and examples thereof include silica, zirconium oxide and titanium oxide, with silica being preferable.

The porous inorganic material preferably has a pore size of 1 nm to 5 nm, and more preferably 2 nm to 3 nm. When the pore size of the porous inorganic material falls within any of these ranges, it is possible to achieve both gas diffusion and prevention of elution of the catalytically active component.

In the redox catalyst, any amount can be used for the porous inorganic material coverage over the surface of the catalytically active component-supporting carbon nanotubes as long as desired effects of this disclosure can be attained. In the redox catalyst, the amount of porous inorganic material coverage over the surface of the catalytically active component-supporting carbon nanotubes is normally 0.01 to 9 times the mass of the catalytically active component-supporting carbon nanotubes (generally corresponding to 1% by mass to 90% by mass in terms of the porous inorganic material content in the redox catalyst), preferably 0.1 to 6 times (generally corresponding to 10% by mass to 85% by mass in terms of the porous inorganic material content in the redox catalyst), more preferably 0.3 to 3 times (generally corresponding to 23% by mass to 75% by mass in terms of the porous inorganic material content in the redox catalyst), and further preferably 0.5 to 1.5 times (generally corresponding to 33% by mass to 60% by mass in terms of the porous inorganic material content in the redox catalyst). When the amount of coverage is at least 0.01 times the mass of the catalytically active component-supporting carbon nanotubes, the redox catalyst shows increased durability. On the other hand, when the amount of coverage is no greater than 9 times the mass of the catalytically active component-supporting carbon nanotubes, the catalytic activity of the redox catalyst can be maintained at high levels, and moreover, it is superior in economic efficiency. When the porous inorganic material is made of silica, for example, the amount of silica coverage can be obtained as the mass ratio of $SiO_2$ to the catalytically active component-supporting carbon nanotubes in the redox catalyst.

<Method of Manufacturing Redox Catalyst>

The redox catalyst disclosed herein can be manufactured by, when the catalytically active component is metal nanoparticles, attaching to the surface of carbon nanotubes a metal precursor such as that described later and covering the metal precursor-supporting carbon nanotubes with a protection film made of porous inorganic material, followed by sintering under a reducing atmosphere to fix the metal in the form of nanoparticles. This manufacturing method is preferred because it does not involve aggregation of carbon nanotubes due to the absence of the sintering step of a catalytically active component for fixation prior to coverage by a protection film, and hence can sufficiently cover the catalytically active component-supporting carbon nanotubes with a protection film made of porous inorganic material.

When the catalytically active component is metal nanoparticles, a specific procedure includes preparing a dispersion liquid containing water, carbon nanotubes and a dispersant, adding a metal precursor to the dispersion liquid, and precipitating the metal precursor by such means as solvent distillation, pH adjustment or centrifugation, whereby metal precursor-supporting carbon nanotubes in which the metal precursor is supported on the carbon nanotubes can be efficiently obtained.

For the metal precursor, a compound is normally used which may produce a metal through a reducing reaction. Any metal precursor can be used as long as it can produce a desired metal. From the perspective of allowing metal to be uniformly supported on the surface of carbon nanotubes, it is preferable to use such metal precursors that are soluble in solvents used. Such metal precursors include salts (including solvates) and complexes of the metals of Groups 4 to 14 in the periodic table. Specific examples thereof include, but not limited to, $Mn(NO_3)_2$, $Co(NO_3)_2$, $Co(NO_3)_3$, $Ni(NO_3)_2$, $FeCl_2$, $FeCl_3$, $Pt(NH_3)_2(NO_2)_2$, $(NH_4)_2[RuCl_6]$, $(NH_4)_2[RuCl_5(H_2O)]$, $H_2PtCl_4$, $H_2PtCl_6$, $K_2PtCl_4$, $K_2PtCl_6$, $H_2[AuCl_4]$, $(NH_4)_2[AuCl_4]$, and $H[Au(NO_3)_4]H_2O$. These metal precursors can be used alone or in combination.

For the dispersant, either low-molecular or high-molecular (polymer) dispersants may be used as long as they exhibit an ability to disperse carbon nanotubes. It is however preferable to use polymers for their superior ability to disperse carbon nanotubes and dispersion stability of carbon nanotubes. The polymers may be synthetic or natural polymers. Ionic polymers are preferable for their superior ability to disperse carbon nanotubes. Ionic polymers with an ionic group such as sulfonic acid or carboxylic acid are preferable. Particularly preferable are polystyrene sulfonic acid, chondroitin sulfate, hyaluronic acid, carboxymethyl cellulose and derivatives thereof, with carboxymethyl cellulose and derivatives thereof being most preferable. When carbon nanotubes with amounts of CO desorption and $CO_2$ desorption as specified above are used, such carbon nanotubes normally do not require dispersants because of their superior dispersibility.

After allowing the metal precursor to be supported on carbon nanotubes as described above, the metal precursor-supporting carbon nanotubes are covered with porous inorganic material on their surface.

Since carbon nanotubues are hydrophobic on their surface, they are prone to repel a feedstock of the porous inorganic material having a hydrophilic group such as Si—OH group. For this reason, it is preferable to perform hydrophilization treatment beforehand; examples of such hydrophilization treatment include, for example, ozone treatment and nitric acid treatment such as those mentioned above.

Coverage by the porous inorganic material first involves dispersing metal precursor-supporting carbon nanotubes into a dispersion medium. Examples of the dispersion medium include, but not limited to, dehydrated ethanol. Water, hydrophilic solvents, hydrophobic solvents, or mixtures thereof may also be used. Alternatively, carbon nanotubes on which a metal precursor is supported are prepared as described above, and the resultant dispersion liquid of the carbon nanotubes may be used as it is.

While coverage by the porous inorganic material may be performed directly to the metal precursor-supporting carbon nanotubes, from the perspective of improving the durability of the redox catalyst as well as maintaining its catalytic activity at high levels, coverage by the porous inorganic material is preferably preceded by pre-coverage of the surface of the metal precursor-supporting carbon nanotubes by a base layer with the use of a base precursor described later. The base layer has a function of increasing wettability and adhesion between the catalytically active component supported on carbon nanotubes and the porous inorganic material. Coverage by the base layer and coverage by the porous inorganic material may each be performed in one stage or may be performed in two or more stages.

Specifically, prior to coverage by the porous inorganic material, the metal precursor-supporting carbon nanotubes are previously covered with a base precursor. This enables wettability and adhesion between the metal precursor and porous inorganic material to be increased in later steps to ensure that the porous inorganic material covers the metal precursor. Coverage by the base precursor can be performed by adding the base precursor dropwise to the dispersion liquid of the metal precursor-supporting carbon nanotubes and stirring the mixture for a given period of time so that the base precursor is adsorbed onto the surface of the metal precursor-supporting carbon nanotubes.

Base precursors used herein include, for example, silane coupling agents having a nitrogen-containing polar group, and compounds having at least one amino group at a molecule terminal.

Examples of the silane coupling agents having a nitrogen-containing polar group include amino group-containing silane coupling agents such as 3-aminopropyltrimethoxysilane, 3-aminopropyltriethoxysilane (APTES), N-2-(aminoethyl)-3-aminopropylmethyldimethoxysilane, N-2-(aminoethyl)-3-aminopropyltrimethoxysilane, 3-triethoxysilyl-N-(1,3-dimethyl-butylidene)propylamine, N-phenyl-3-aminopropyltrimethoxysilane, and N-(vinylbenzyl)-2-aminoethyl-3-aminopropyltrimethoxysilane hydrochloride; isocyanurate ring-containing silane coupling agents such as tri s-(trimethoxysilylpropyl)isocyanurate; ureido group-containing silane coupling agents such as 3-ureidopropyltriethoxysilane; and isocyanate group-containing silane coupling agents such as 3-isocyanatepropyltriethoxysilane.

Examples of the compounds having at least one amino group at a molecule terminal include acetoamide, malonamide, glycinamine, alaninamide, oxamide, urea, 1,1-diaminomethane, 1,2-diaminoethane, 1,3-diaminopropane, 1,4-diaminobutane, 1,5-diaminopentane, 1,6-diaminohexane, 2,2-dimethyl-1,2-propanediamine, 2-methyl-1,3-propanediamine, 3,3-diamino-N-methyl dipropylamine, 3,3-diaminodipropylamine, 1,3-diamino-2-propanol, 1,2-cyclohexanediamine, p-xylenediamine, 4-aminocarbonylbenzylamine, 3-aminocarbonylbenzyl amine, tetrafluoro-p-xylenediamine, tris(3-aminopropyl) amine, and 3,3,3-nitrilotris(propylamine); and amino acids such as arginine, asparagine, glutamine, glutamic acid, sodium glutamate, and lysine.

These base precursors may be used alone or in combination.

Any amount of the base precursor can be used; however, it is normally 10 parts by mass to 1,000 parts by mass per 100 parts by mass of carbon nanotubes used. A usage amount falling within this range enables wettability and adhesion between the metal precursor and porous inorganic material to be increased to ensure that the porous inorganic material covers the metal precursor. When the usage amount is less than the range, it results in poor desired effects, and when the usage amount exceeds the range, it results in poor balance among catalytic activity, reliability and economic efficiency.

Subsequently, the metal precursor-supporting carbon nanotubes are covered with a porous inorganic material precursor. When a silane coupling agent is used as the base precursor, it is preferable to use silane compounds described later as the porous inorganic material precursor. In this embodiment, a silane compound as a porous inorganic material precursor, water, and a pH adjusting liquid are added to a dispersion liquid of the metal precursor-supporting carbon nanotubes and stirred for a given period of time to effect hydrolysis and condensation reactions of the silane compound, whereby the metal precursor-supporting carbon nanotubes can be covered with the porous inorganic material.

When a silane coupling agent is used as the base precursor and a silane compound as the porous inorganic material precursor, the base layer to be formed is considered to bind with the silica of the porous inorganic material via siloxane linkage, and is assumed to directly contribute to the exertion of the function of the porous inorganic material. Accordingly, in this case, the amount of porous inorganic material coverage in the redox catalyst includes the amount of base layer coverage. As described above, when the porous inorganic material is made of silica, the amount of silica coverage can be obtained as the mass ratio of $SiO_2$ to the catalytically active component-supporting carbon nanotubes in the redox catalyst; in this case, the amount of coverage includes a fraction contributed by the base layer.

Examples of the porous inorganic material precursor include silane compounds such as tetramethoxysilane, tetraethoxysilane (TEOS), tetra-n-propoxysilane, tetra-i- propoxysilane, tetra-n-butoxysilane, tetraphenoxysilane, methyltrimethoxysilane, methyltriethoxysilane, ethyltrimethoxysilane, ethyltriethoxysilane, propyltrimethoxysilane, propyltriethoxysilane, butyltrimethoxysilane, butyltriethoxysilane, pentyltrimethoxysilane, pentyltriethoxysilane, cyclohexyltrimethoxysilane, cyclohexyltriethoxysilane, phenyltrimethoxysilane, phenyltriethoxysilane, vinyltrimethoxysilane, vinyltriethoxysilane, allyltrimethoxysilane, methyltriphenoxysilane, dimethyldimethoxysilane, dimethyldiethoxysilane, diethyldimethoxysilane, diethyldiethoxysilane, dipropyldimethoxysilane, dipropyldiethoxysilane, dibutyldimethoxysilane, dibutyldiethoxysilane, pentylmethyldimethoxysilane, pentylmethyldiethoxysilane, cyclohexylmethyldimethoxysilane, cyclohexylmethyldiethoxysilane, phenylmethyldimethoxysilane, phenylmethyldiethoxysilane, dipentyldimethoxysilane, dipentyldiethoxysilane, dihexyldimethoxysilane, dihexyldiethoxysilane, diheptyldimethoxysilane, diheptyldiethoxysilane, dioctyldimethoxysilane, dioctyldiethoxysilane, dicyclohexyldimethoxysilane, dicyclohexyldiethoxysilane, diphenyldimethoxysilane, diphenyldiethoxysilane, and dimethyldiphenoxysilane. These porous inorganic material precursors may be used alone or in combination.

Any amount of the porous inorganic material precursor can be used; however, in terms of total amount of the porous inorganic material precursor and base precursor, it is normally 50 parts by mass to 3,000 parts by mass per 100 parts by mass of carbon nanotubes used, preferably 100 parts by mass to 2,500 parts by mass, more preferably 200 parts by mass to 2,000 parts by mass, still more preferably 300 parts by mass to 1,800 parts by mass, and most preferably 600 parts by mass to 1,500 parts by mass. Further, the usage amount of the porous inorganic material precursor is preferably 10 parts by mass to 3,000 parts by mass per 100 parts by mass of the catalytically active component.

The ratio of the usage amount of the base precursor to the porous inorganic material precursor (base precursor/porous inorganic material precursor) is normally 0.01 to 40 by mass.

When the usage amount of the porous inorganic material precursor falls within this range, the redox catalyst shows increased durability and maintains high levels of catalytic activity.

Any pH adjusting liquid can be used, and $HNO_3$ can be used, for example. The pH of the solution prepared by adding a silane compound as the porous inorganic material precursor, water and a pH adjusting liquid to the dispersion liquid of the metal precursor-supporting carbon nanotubes is preferably 1 to 6, and more preferably 2 to 4, from the perspective of proper hydrolysis and condensation reactions of the silane compound.

When a silane coupling agent is used as the base precursor and a silane compound as the porous inorganic material precursor, the two compounds may be mixed for covering the metal precursor-supporting carbon nanotubes in one stage.

Subsequently, where appropriate, the resultant product is subjected to washing, separation and drying, so that the porous inorganic material coating on the metal precursor-supporting carbon nanotubes is fixed.

For washing, for example, alcohol washing can be used.

For separation, for example, centrifugal separation or the like can be used.

For drying, for example, vacuum drying, natural drying, evaporation to dryness, rotary evaporator, spray dryer, or drum dryer can be used. Drying time may be appropriately determined according to the drying method used. Alternatively, drying may be effected in a sintering step later described without performing drying. Drying temperature is preferably from 30° C. to 800° C., and more preferably from 50° C. to 500° C. Drying may be performed under an inactive gas (non-oxidizing) atmosphere such as in argon, nitrogen or helium gas. Following drying, the metal precursor-supporting carbon nanotubes covered with the porous inorganic material may be micronized by any of the methods known in the art where desired.

After fixation of the porous inorganic material coating, the metal precursor-supporting carbon nanotubes covered with the porous inorganic material are further subjected to sintering/fixation to yield the redox catalyst disclosed herein, in which the surface of carbon nanotubes on which metal nanoparticles as the catalytically active component are supported is covered with the porous inorganic material.

When the catalytically active component is metal nanoparticles, sintering/fixation is normally performed under a reducing atmosphere such as under hydrogen stream. Sintering/fixation under a reducing atmosphere is preferably performed at a temperature of 200° C. to 800° C., and more preferably 200° C. to 500° C. This causes the metal precursor supported on the carbon nanotubes to be reduced into metal nanoparticles, resulting in the redox catalyst disclosed herein, which is formed of carbon nanotubes on which metal nanoparticles as the catalytically active component are supported and which are covered with porous inorganic material. Sintering/fixation is preferably performed under an inactive gas (non-oxidizing) atmosphere such as in argon, nitrogen or helium gas to prevent the oxidization of carbon nanotubes from proceeding.

[Electrode Material]

Next, an electrode material disclosed herein will be described in detail.

The electrode material is characterized by including the redox catalyst described above. Examples of the electrode material include dispersion liquids of the redox catalyst described above and conductive films obtained from the dispersion liquids. The electrode material normally contains the redox catalyst as an electrode catalyst and is normally used in forming a catalyst layer of an electrode.

The electrode material may contain, in addition to the redox catalyst, binders, conductive additives and the like in amounts that do not compromise the effect of the electrode material.

The electrode material can be obtained for example by mixing the isolated redox catalyst with other component(s). The redox catalyst content in the electrode material is normally 1% by mass to 100% by mass.

When the electrode material is a dispersion liquid of the redox catalyst, examples of solvents that can be used to prepare the dispersion liquid include water; alcohols such as methanol, ethanol, and propanol; ketones such as acetone and methyl ethyl ketone; ethers such as tetrahydrofuran, dioxane, and diglyme; amides such as N,N-dimethylformamide, N,N-dimethylacetamide, N-methyl-2-pyrrolidone, and 1,3-dimethyl-2-imidazolidinone; and sulfur-containing solvents such as dimethyl sulfoxide and sulfolane. These solvents may be used alone or in combination.

The dispersion liquid may further contain dispersants, surfactants and the like in amounts that do not compromise the effects of this disclosure. Dispersants, surfactants and the like known in the art may be used as appropriate.

Any amount of the redox catalyst can be contained in the dispersion liquid; however, it is preferably 0.001% by mass to 10% by mass of the total of the dispersion liquid.

When the electrode material is a conductive film, the conductive film can be of any thickness; it is normally 50 nm to 1 mm in thickness.

When the thickness of the conductive film falls within this range, it is possible to obtain a conductive film which is more useful as a conductive layer or catalyst layer for electrodes and the like.

[Electrode]

Next, an electrode disclosed herein will be described in detail.

The electrode is characterized by being formed using the electrode material described above. The electrode can be manufactured for example by applying the electrode material (dispersion liquid of the redox catalyst) onto a given conductive or porous substrate and drying the resultant coating to form a catalyst layer.

The catalyst layer can be of any thickness; however, it is preferably 0.005 μm to 100 μm in thickness. The amount of the redox catalyst in the catalyst layer is preferably 0.1 $mg/m^2$ to $2\times10^4$ $mg/m^2$.

Examples of the electrode disclosed herein include electrodes for fuel cells (air electrode and fuel electrode), in particular for solid polymer fuel cells.

[Membrane Electrode Assembly for Fuel Cells]

Next, a membrane electrode assembly for fuel cells disclosed herein will be described in detail.

The membrane electrode assembly (MEA) for fuel cells is characterized by including the electrode described above and an electrolyte membrane, and is normally configured by disposing an air electrode and a fuel electrode on either side of the electrolyte membrane. In the membrane electrode assembly for fuel cells, the electrode described above may be used as the air electrode or as the fuel electrode.

The electrode of the membrane electrode assembly for fuel cells is normally composed of a catalyst layer adjacent to the electrolyte layer and of a gas diffusion layer adjacent to the catalyst layer, and the redox catalyst and the electrode material disclosed herein can be used as the catalyst layer. With the catalytically active component being covered with the porous inorganic material in the membrane electrode assembly for fuel cells disclosed herein, it is possible to prevent elution of the catalytically active component at an interface between the catalyst layer of the electrode and the electrolyte layer.

Electrolyte membranes known in the art can be utilized as the electrolyte membrane. Examples include fluorine-based electrolyte membranes such as perfluorocarbon sulfonic acid resin membranes, and hydrocarbon-based electrolyte membranes such as poly(trifluorostyrene)sulfonic acid resin membranes. The electrolyte membrane can be of any thickness; it is normally 50 nm to 10 mm in thickness.

Using the redox catalyst and electrode material disclosed herein, it is possible to obtain the electrode and membrane electrode assembly for fuel cells described above. However, the redox catalyst and electrode material generally show unstable characteristics (initial characteristics) from immediately after manufacture to a certain time point after beginning of use. Thus, it is preferable to use the electrode and the like in practical applications after stabilizing the characteristics of the redox catalyst and the like. For stabilization of the characteristics of the redox catalyst and the like, it is suitable to subject them to a redox reaction. Accordingly, upon use of the electrode and membrane electrode assembly for fuel cells in practical applications, for example, the electrode and the like are continuously or discontinuously energized in their normal use form for a certain period of time immediately after manufacture, so that the redox catalyst and the like constituting the electrode and the like are subjected to a redox reaction for stabilization of the characteristics of the redox catalyst and the like. Energizing can be any length of time; however, it is normally 0.1 hours to 72 hours, and preferably 0.5 hours to 48 hours. The electrode and membrane electrode assembly which have been energized for 0.5 hours to 48 hours immediately after manufacture are particularly suitable for their possibility of exerting stable characteristics.

[Fuel Cell]

Next, a fuel cell disclosed herein will be described in detail.

The fuel cell is characterized by including the membrane electrode assembly for fuel cells described above.

A specific example of the fuel cell is, for example, a solid polymer fuel cell including the membrane electrode assembly (MEA) described above and separators positioned on either side thereof.

As the fuel cell disclosed herein includes an electrode obtained using an electrode material containing the redox catalyst as an electrode catalyst, it has high power efficiency and superior durability. In particular, such a fuel cell which includes a membrane electrode assembly for fuel cells which has been energized for 0.5 hours to 48 hours immediately after manufacture is most suitable as it may exert stable characteristics.

Figure 1:
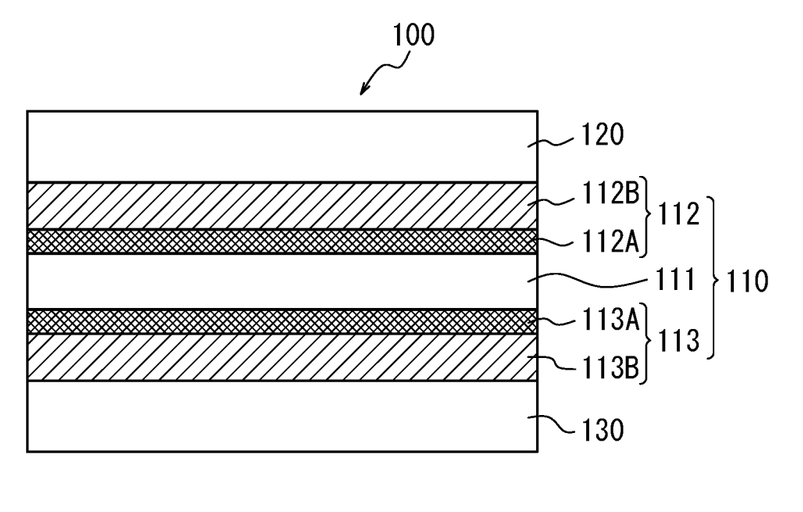
FIG. 1 is a partial cross-sectional view of a fuel cell of an embodiment according to this disclosure.

Next, the membrane electrode assembly (MEA) for fuel cells and the fuel cell disclosed herein will be described with reference to FIG. 1. FIG. 1 is a partial cross-sectional view of a fuel cell according to an embodiment of this disclosure. A fuel cell 100 illustrated in FIG. 1 includes a membrane electrode assembly (MEA) 100, and a cathode separator 120 and an anode separator 130 which are positioned on either side thereof. The membrane electrode assembly 110 is composed of an electrolyte membrane 111 and of an air electrode 112 and a fuel electrode 113 which are positioned on either side thereof.

The air electrode 112 includes a cathode catalyst layer 112A on the side adjacent to the electrolyte membrane 111, and a cathode gas diffusion layer 112B on the side not adjacent to the electrolyte membrane 111. That is, the cathode gas diffusion layer 112B is positioned between the cathode catalyst layer 112A and the cathode separator 120.

The fuel electrode 113 includes an anode catalyst layer 113A on the side adjacent to the electrolyte membrane 111, and an anode gas diffusion layer 113B on the side not adjacent to the electrolyte membrane 111. That is, the anode gas diffusion layer 113B is positioned between the anode catalyst layer 113A and the anode separator 130.

As described above, any electrolyte membrane known in the art can be utilized as the electrolyte membrane 111, and the cathode catalyst layer 112A and the anode catalyst layer 113A can be formed using the electrode material disclosed herein. The cathode catalyst layer 112A and the anode catalyst layer 113A are each preferably 0.005 μm to 100 μm in thickness. The cathode catalyst layer 112A and the anode catalyst layer 113A each preferably contain 0.1 $mg/m^2$ to $2\times10^5$ $mg/m^2$ of the redox catalyst disclosed herein.

For the cathode gas diffusion layer 112B and anode gas diffusion layer 113B, it is possible to use conductive porous substrate such as carbon paper, carbon cloth or carbon non-woven fabric. The cathode gas diffusion layer 112B and anode gas diffusion layer 113B can each be of any thickness; however, they are each normally 100 nm to 10 mm in thickness.

The membrane electrode assembly 110 can be manufactured for example by forming a laminate having the cathode catalyst layer 112A and cathode gas diffusion layer 112B (air electrode 112) and a laminate having the anode catalyst layer 113A and anode gas diffusion layer 113B (fuel electrode 113), sandwiching the electrolyte membrane 111 with the laminates (air electrode 112, fuel electrode 113) with their respective catalyst layers 112A, 113A facing each other, and bonding these components by pressurizing.

For the cathode separator 120 and anode separator 130, commonly used separators can be used which have a channel, e.g., for fuel, air or generated water (not illustrated) formed on the surface. Examples of such separators include those composed of metal materials such as iron, titanium, aluminum and alloys thereof; carbonaceous materials such as carbon graphite and carbon plate; polymer materials provided with electrical conductivity by means of various metal materials or carbonaceous materials (conductive plastics); and so forth.

EXAMPLES

In the following, this disclosure will be described with reference to Examples, which however shall not be construed as limiting by any means.

<Evaluation Method>
(1) Evaluations Based on ECSA

Cyclic voltammetry (CV) measurement was performed in a manner as described below, and electrochemical surface area (ECSA) was calculated and evaluated according to the peak area for hydrogen desorption from the Pt catalyst of the silica-covered, Pt-supporting CNTs manufactured.

Specifically, after immersing a working electrode into 0.1M $HClO_4$ electrolyte and $N_2$ purging, 100 cycles of changing the working electrode potential at a scan rate of 20 mV/s in the scan range of 0.05 V to 1.20 V for each cycle were repeated, and CV measurement was performed to calculate the initial ECSA as an average value. Further, after 600 cycles of potential change at a scan rate of 100 mV/s, similar CV measurement was performed to calculate the ECSA as an average value. The device and condition used are given below.

Device: Three-electrode electrochemical cell (Potentiostat HZ5000A from Hokuto Denko Corporation)
Electrolyte: 0.1M $HClO_4$
Working electrode: Glassy carbon rod coated with silica-covered Pt-supporting CNTs prepared in Example or Comparative Example
Reference electrode: Reversible hydrogen electrode
Counter electrode: Platinum mesh (2) Dispersibility Evaluation Silica-covered, Pt-supporting CNTs dispersed in water/ethanol were observed by transmission electron microscopy (TEM) to evaluate the state of the CNTs.

(Evaluation Standard)
Dispersibility of the Silica-covered, Pt-supporting CNTs
  Good: Aggregated CNTs in bundled structure of at least 100 nm size is <50% of the total
  Poor: Aggregated CNTs in bundled structure of at least 100 nm size is 50% of the total (3) Amounts of Supported Silica and Pt The silica-covered, Pt-supporting CNTs were analyzed by ICP to find the mass of silica and Pt (Preparation of SGCNTs)

CNTs (SGCNTs) were prepared by the super growth method in accordance with the description of WO2006/011655. Upon preparation of the SGCNTs, a catalyst layer was formed on the substrate surface through a wet process, and feedstock gas containing acetylene as the main component was used.

The SGCNTs obtained were mainly composed of single-wall CNTs and had a BET specific surface area of 804 $m^2/g$ as measured by nitrogen adsorption, CO desorption of 797 μmol/g, $CO_2$ desorption of 292 μmol/g, and micropore volume of 0.44 mL/g. Further, the SGCNTs had an average diameter (Av) of 3.3 nm, a diameter distribution (3σ) of 1.9 nm, 3σ/Av of 0.58, and an average length of 500 μm.

(Preparation of Oxidized SGCNTs)

A recovery flask having a capacity of 500 mL was loaded with 1 g of the SGCNTs obtained above and connected to an evaporator. At normal pressure a stream of a mixture gas of ozone and air from an ozone generator was supplied through the gas channel of the evaporator at a flow rate of 600 mL/min and at an ozone concentration of 20 g/$Nm^3$, and the recovery flask was rotated by the evaporator for 6 hours at room temperature for reaction to yield oxidized SGCNTs. The oxidized SGCNTs obtained had CO desorption of 5,511 μmol/g and $CO_2$ desorption of 1,440 μmol/g.

Example 1

50 mg of the oxidized SGCNTs was placed into a 50 ml-glass sample container. To the container was added 11 ml of distilled water and 11 ml of ethanol and sonicated for 1 hour at room temperature in a ultrasonic bath (BRUNSON) to disperse the oxidized SGCNTs. 139.9 mg of chloroplatinic acid aqueous solution (Pt content: 15.3% by mass) was further added and sonicated for 30 minutes in the ultrasonic bath (pH at this time was 2.0). The pH of the solution was adjusted to 10.9 by the addition of 10-fold diluted ammonia water (concentration: 28% by mass). The solution was then centrifuged at 3,000 rpm for 20 minutes in a centrifugal separator (KUBOTA Corporation) and the supernatant was discarded. To this was added again 11 ml of distilled water and 11 ml of ethanol, and the resultant solution was confirmed to have a pH in the alkaline range (10.10 to 10.35). After placing a magnetic stirrer in the sample container, the sample container was placed in a 60° C. water bath and the solution was stirred for 30 minutes with the magnetic stirrer.

To the sample container was added 72 mg of 3-aminopropyltriethoxysilane (APTES; Tokyo Chemical Industries Co., Ltd., purity: ≥98%) as a base precursor and stirred for 30 minutes. 286 mg of tetraethoxysilane (TEOS; Kanto Chemical Co., Inc., purity: ≥99.9%) was further added as a porous inorganic material precursor, and stirred for 2 hours. Thereafter, the sample container was centrifuged (3,000 rpm, 20 minutes) and the supernatant was discarded after confirming that the supernatant has a pH of 10 or higher.

Subsequently, the sample container was placed in a 60° C. thermostatic chamber and dried overnight, and the dried sample (silica-covered, Pt precursor-supporting SGCNTs prior to sintering) was ground in an agate mortar, placed in a quarts glass wool-loaded quarts glass tube (30 mm inner diameter) and reduced in an electric furnace (Honma Riken) for 2 hours at 350° C. under a stream of mixed gas of hydrogen (20 ml/m) and nitrogen (80 ml/l). The sample was cooled to room temperature, and the resultant powder (silica-covered, Pt supporting SGCNTs) was evaluated for various physical properties by TEM and ICP. The resultant silica-covered, Pt-supporting SGCNTs were dispersed in ethanol, dropped onto a glassy carbon rod subjected to polishing and washing, and dried. Thereafter, a mixture solution of 5% (by mass) Nafion solution and methanol was dropped thereon and dried to form a working electrode.

The evaluation results are shown in Table 1. The supported Pt particles had a particle diameter of 2 nm.

Example 2

Experiment was carried as in Example 1 except that the amount of 3-aminopropyltriethoxysilane (APTES) was changed to 143 mg and the amount of tetraethoxysilane (TEOS) to 574 mg.

Example 3

Experiment was carried as in Example 1 except that the amount of 3-aminopropyltriethoxysilane (APTES) was changed to 36 mg and the amount of tetraethoxysilane (TEOS) to 50 mg.

Comparative Example 1

Experiment was carried out as in Example 1 except that silica coverage was not performed. The results are shown in Table 1. The supported Pt particles had a particle diameter of 2 nm.

this disclosure, it is also possible to provide an electrode material containing the redox catalyst, an electrode and a membrane electrode assembly for fuel cells formed using the electrode material, and a fuel cell including the membrane electrode assembly for fuel cells.

REFERENCE SIGNS LIST 100 fuel cell
110 membrane electrode assembly
111 electrolyte layer
112 air electrode
112A cathode catalyst layer
112B cathode gas diffusion layer
113 fuel electrode
113A anode catalyst layer
113B anode gas diffusion layer
120 cathode separator
130 anode separator

The invention claimed is:

1. A redox catalyst wherein a catalytically active component is supported on carbon nanotubes whose average diameter (Av) and standard deviation ($\sigma$) of diameters satisfy the condition $0.60 > 3\sigma/Av > 0.20$, and at least a part of a surface of the carbon nanotubes, including a part on which the catalytically active component is supported, is covered with porous inorganic material.

2. The redox catalyst of claim 1, wherein the carbon nanotubes have a carbon monoxide desorption of 1,000 μmol/g to 20,000 μmol/g and a carbon dioxide desorption of 500 μmol/g to 10,000 μmol/g at from 150° C. to 950° C. in temperature programmed desorption.

TABLE 1

| | | Example 1 | Example 2 | Example 3 | Comparative Example 1 |
|---|---|---|---|---|---|
| Redox catalyst | CNTs | Oxidized SGCNTs | Oxidized SGCNTs | Oxidized SGCNTs | Oxidized SGCNTs |
| | Amount of supported Pt [Pt/(Pt + CNTs)] (% by mass) | 11 | 20 | 17 | 13 |
| Amount of silica coverage | Mass ratio (SiO$_2$/Pt-supporting CNTs) (fold) | 1.1 | 1.1 | 0.3 | — |
| | SiO$_2$ content (% by mass) | 53 | 53 | 23 | 0 |
| Evaluation | Dispersibility | Good | Good | Good | Poor |
| ECSA (m$^2$/mg-Pt) | Initial | 130 | 110 | 75 | 70 |
| | After 600 cycles | 93 | 110 | 65 | 41 |

The results given in Table 1 demonstrate that the catalysts prepared in Examples wherein Pt is supported on carbon nanotubes which have a 3σ/Av of greater than 0.20 and less than 0.60 and further covered with silica showed high electrochemical surface area (ECSA) for the initial and after 600 cycles of CV and therefore have superior durability and catalytic activity.

INDUSTRIAL APPLICABILITY

The redox catalyst disclosed herein can be used as an electrode material for electrodes of fuel cells. According to 3. The redox catalyst of claim 1, wherein the catalytically active component is metal nanoparticles.

4. An electrode material comprising the redox catalyst of claim 1.

5. An electrode formed using the electrode material of claim 4.

6. A membrane electrode assembly for fuel cells comprising the electrode of claim 5 and an electrolyte membrane.

7. A fuel cell comprising the membrane electrode assembly for fuel cells of claim 6.

* * * * *